(12) United States Patent
Purol

(10) Patent No.: US 11,545,917 B2
(45) Date of Patent: Jan. 3, 2023

(54) ENERGY HARVESTING POWER BANK

(71) Applicant: David Merritt Purol, Romney, WV (US)

(72) Inventor: David Merritt Purol, Romney, WV (US)

(*) Notice: Subject to any disclaimer, the term of this patent is extended or adjusted under 35 U.S.C. 154(b) by 449 days.

(21) Appl. No.: 16/792,179

(22) Filed: Feb. 14, 2020

(65) Prior Publication Data

US 2021/0257938 A1   Aug. 19, 2021

(51) Int. Cl.
*H02N 2/18* (2006.01)

(52) U.S. Cl.
CPC ............. *H02N 2/183* (2013.01); *H02N 2/181* (2013.01)

(58) Field of Classification Search
CPC ............................... H02N 2/181; H02N 2/183
See application file for complete search history.

(56) References Cited

U.S. PATENT DOCUMENTS

| 10,566,915 B1 | 2/2020 | Purol | |
|---|---|---|---|
| 2011/0095652 A1* | 4/2011 | Winger | A45F 5/02 310/339 |

* cited by examiner

*Primary Examiner* — Yaron Cohen
(74) *Attorney, Agent, or Firm* — Purol Patents

(57) ABSTRACT

The present invention is directed to a power bank with the capability to harvest electric energy which is then configured to charge its onboard battery such that the power bank is self-recharging. The energy harvesting power bank has an internal area provided with a piezoelectric mass suspended within a suspension frame by resilient members. The internal area is lined with piezoelectric film that is impacted by the piezoelectric mass as a result of the kinetic energy derived from movement of the power bank. As a consequence, the piezoelectric materials will generate electrical energy which will undergo conditioning by energy harvester electronics. The conditioned electrical energy is used to provide power to the USB charging port for use in recharging portable devices.

50 Claims, 6 Drawing Sheets

ENERGY HARVESTING POWER BANK

CROSS-REFERENCE TO RELATED APPLICATION

Not Applicable

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of portable power banks for supplying power to a wide range of portable electronic devices such as smartphones, tablets, vapes, or other similar power consumption devices.

2. Description of the Related Art

Many portable electronic devices include a self-contained portable power source such as a rechargeable battery. However, the power supplied by the battery is limited because the battery is either used once, replaced upon depletion, or is required to be periodically recharged with an AC adapter. This is impractical for the replacement cost of depleted batteries is expensive. Also, this is inconvenient for an electrical outlet may not be readily available for use with the AC adapter, especially at outdoor locations, which makes the recharging of the electronic device difficult. Thus, a need exists for a portable power bank which provides power for recharging electronic devices that is not dependent upon an external source of energy such as an electrical outlet or require the replacement of a battery supply.

BRIEF SUMMARY OF THE INVENTION

In view of the foregoing disadvantages inherent in the known art, the present invention provides for a novel power bank having an energy harvester. The general purpose of the present invention, which will be described subsequently in greater detail is to provide a power bank with the capability to harvest electric energy which is then configured to recharge the onboard battery of the power bank. This will be advantageous for one will no longer be constrained by the availability of an electrical outlet in recharging their electronic devices. In a preferred embodiment, this is accomplished with the use of a piezoelectric film arranged within an interior volume of the power bank. Also disposed in the interior volume is a frame suspending a piezoelectric mass by a series of resilient members. The piezoelectric mass is suspended by the resilient members so as to freely swing within the interior volume and easily impact the piezoelectric film. With this arrangement, any incidental movement of the power bank will result in the impact of the piezoelectric mass with the piezoelectric film resulting in the generation of electrical energy. The generated electrical energy is transmitted to a circuit where it is conditioned and supplied to the onboard battery. The power bank is provided with the convenience of a USB port so as to interface with an electronic device that needs to be recharged.

The energy harvesting power bank of the invention is of a practical size and may be readily carried by a person such as in their purse, backpack, or pockets of clothing. The motion of one carrying the power bank converts that kinetic energy to the piezoelectric mass and the piezoelectric film permitting their impact which is facilitated by the resilient members. It is with this arrangement that the onboard battery will always have the required charge available when it is desired.

The present invention holds significant improvements and serves as a power bank that harvests energy incidental to motion and movement. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate a preferred embodiment of use for the energy harvesting power bank of the present invention, constructed and operative according to the teachings of the present invention.

The various embodiments of the present invention will hereinafter be described in conjunction with the appended drawings, wherein like designations denote like elements.

DETAILED DESCRIPTION

Figure 1:
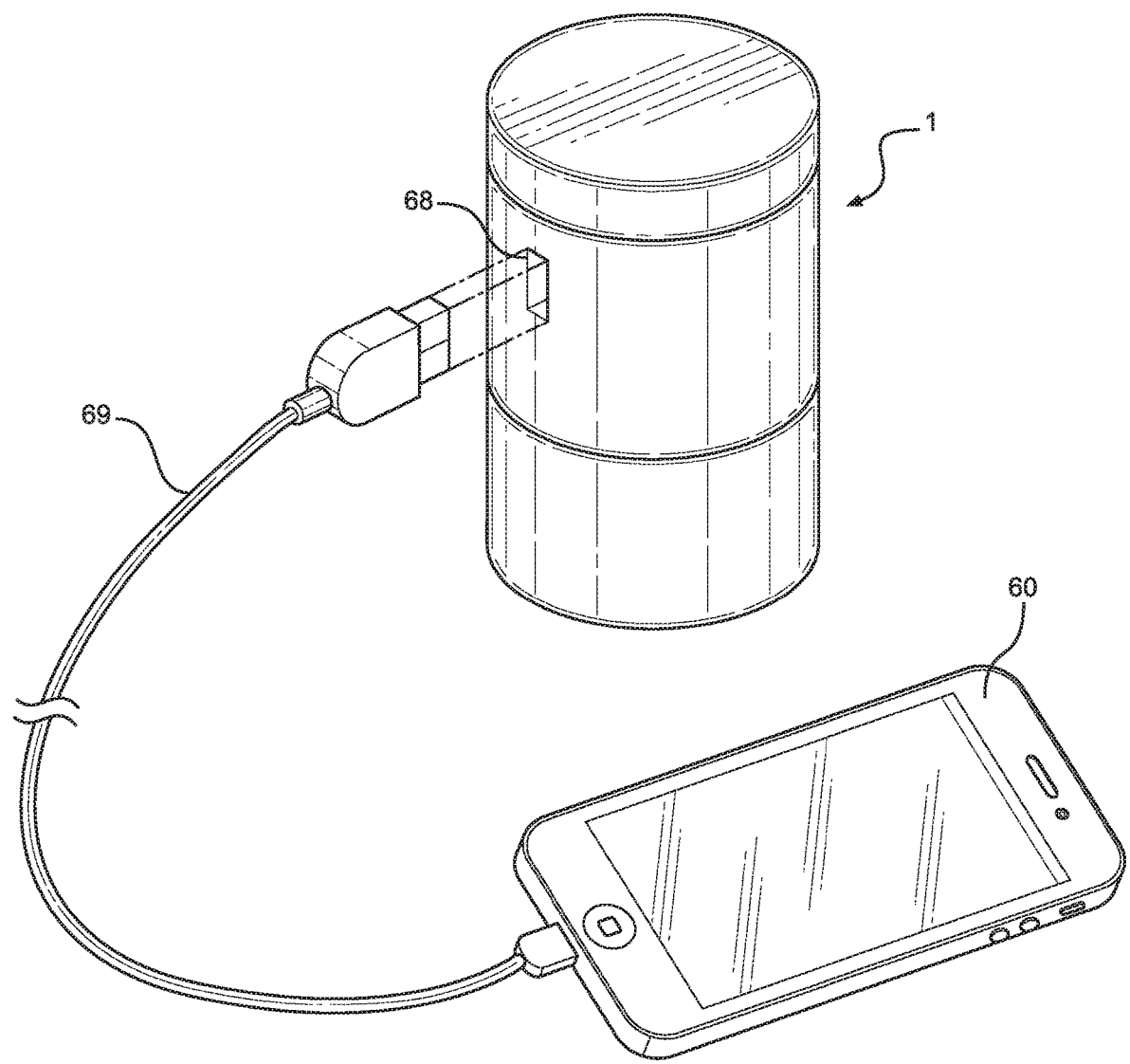
FIG. 1 shows a perspective view illustrating an energy harvesting power bank according to an embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present intention to those skilled in the art. Like reference numerals refer to like elements throughout.

The terms used in this disclosure are not for limiting the inventive concept but for explaining the embodiments. The terms of a singular form may include plural forms unless otherwise specified. Also, the meaning of "include", "comprise", "defined", "including", "having" or "comprising" specifies a property, a region, a fixed number, an element or a component but does not exclude other properties, regions, fixed numbers, elements or components. The reference numerals presented according to a sequence of explanations are not limited to the sequence.

As discussed above, an embodiment of the present invention relates to a power bank with the capability to harvest electric energy which is then configured to recharge the onboard battery of the power bank. As shown in FIG. 1 a cable 69 is used so as to interface the charging port of a rechargeable portable device 60 to the charging port, such as a USB port 68, of the energy harvesting power bank 1 according to the present invention. This allows for the requisite power to be supplied in recharging the portable device 60. While the charging port is disclosed as a USB port 68 it is within the scope of the present invention to utilize other types of charging ports so as to be compatible with different peripherals. Anyone of a number of rechargeable devices including that of a smart phone, tablet computer, vape, or the like may be recharged according to the present invention.

Figure 2:
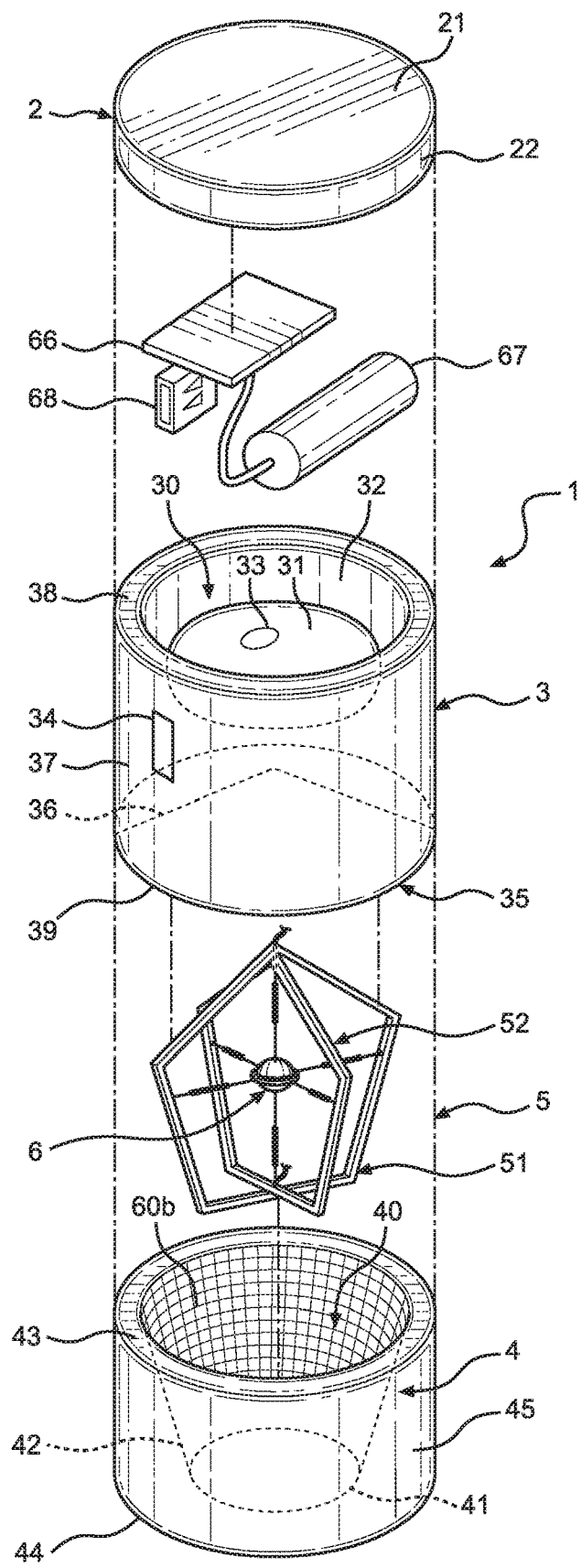
FIG. 2 is an exploded perspective view of the energy harvesting power bank according to an embodiment of the present invention of FIG. 1.
Figure 3:
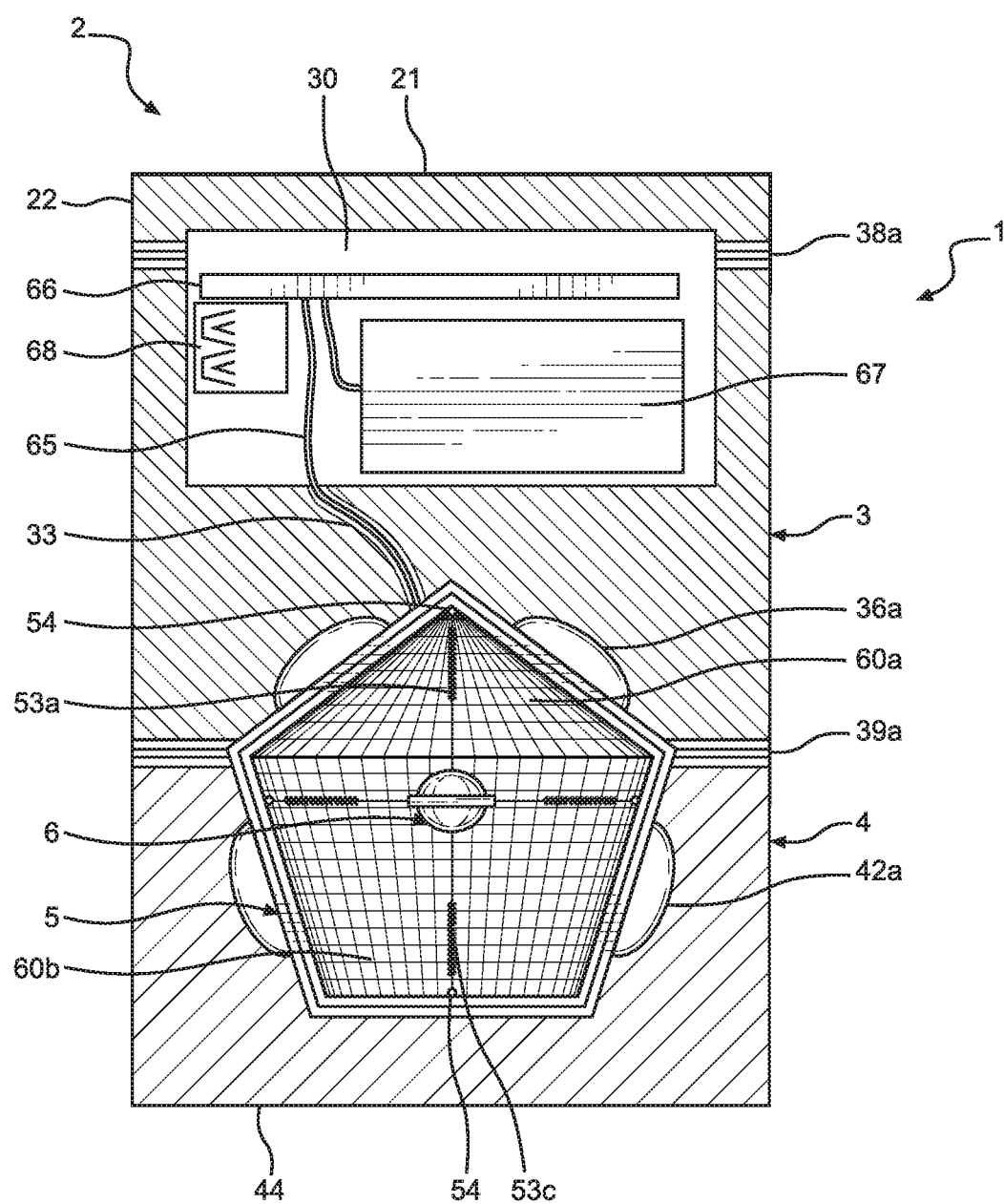
FIG. 3 is a cross sectional view illustrating the energy harvesting power bank according to an embodiment of the present invention of FIG. 1.

Referring now to FIG. 2 and FIG. 3 there is shown the energy harvesting power bank 1 as having a generally elongated body with an internal area configured to house an energy harvesting arrangement. The generally elongated body is comprised of a top member 2, an intermediate member 3, and a bottom member 4. The top member 2 is selectively secured to the intermediate member 3 by an interference fit 38a. The intermediate member 3 is selectively secured to the bottom member 4 by an interference fit 39a. The interference fit 38a, 39a may also be one of a threaded interconnection, interlocking rib and groove interconnection, glue, ultrasonic welding, or the like.

The top member 2 is defined by an upper surface 21 delineated by an outer peripheral surface 22. The intermediate member 3 is defined by an outer peripheral surface 37 having an upper end 38 and a lower end 39. Disposed adjacent to the upper end 38 is a first interior volume 30 defined by a bottom wall surface 31 delineated by an inner periphery surface 32. The first interior volume 30 forms a portion of the internal area of the elongated body. The outer peripheral surface 37 has an opening 34 in communication with the inner periphery surface 32 through which the USB port 68 is accessed. Disposed adjacent to the lower end 39 is a second interior volume 35 defined by a conical interior surface 36. The second interior volume 35 further forms a portion of the internal area. The bottom wall surface 31 has a channel opening 33 in communication with the second interior volume 35 as will be further described below. The bottom member 4 is defined by an outer peripheral surface 45 having an upper end 43 and a lower end 44. Disposed adjacent to the upper end 43 is a third interior volume 40 defined by a bottom wall surface 41 delineated by a truncated conical surface 42. The third interior volume 40 also forms a portion of the internal area of the elongated body.

Figure 4:
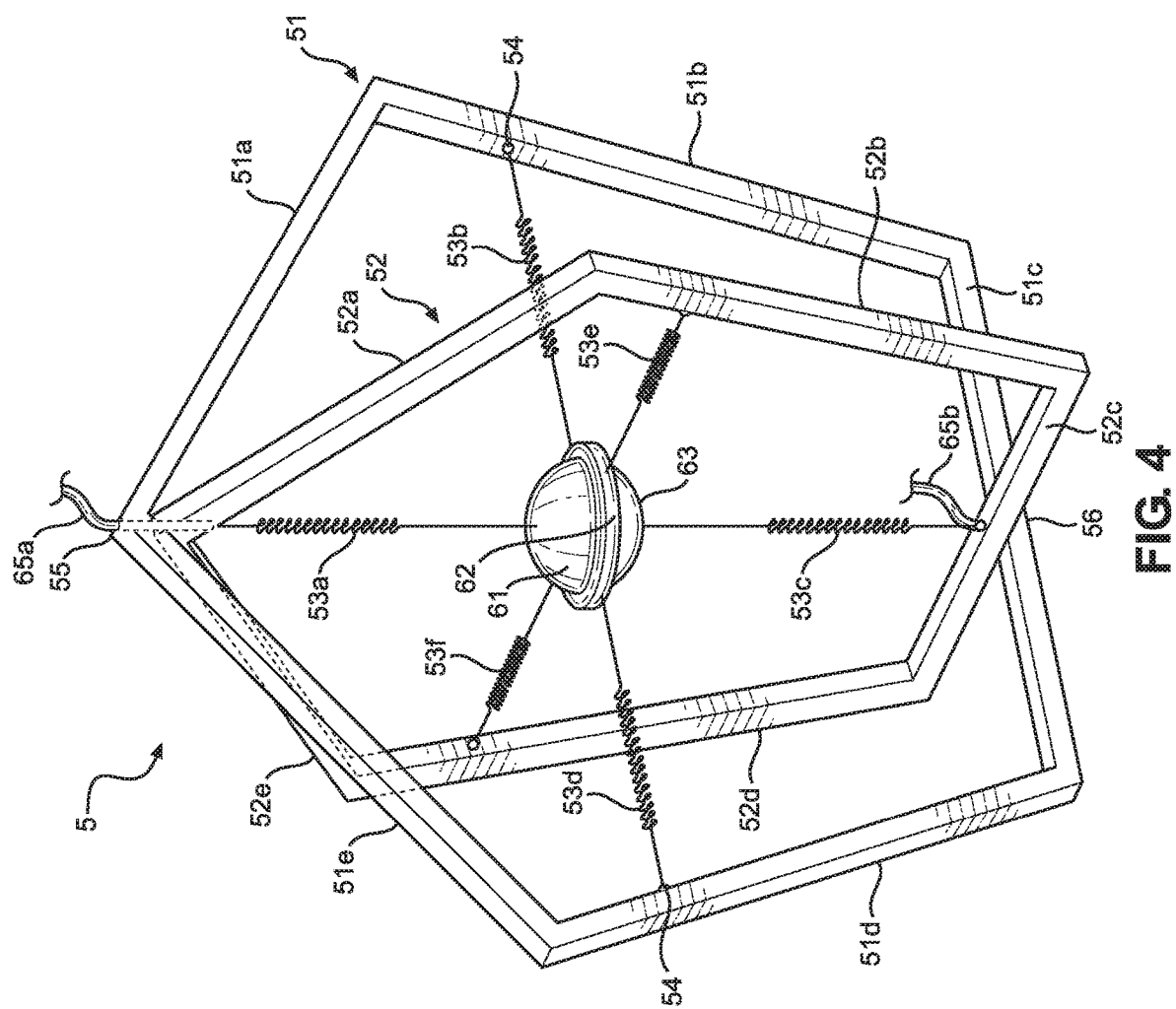
FIG. 4 is a perspective view illustrating the suspension frame according to an embodiment of the present invention of FIG. 1.

A suspension frame 5 is provided for resiliently suspending a piezoelectric mass 6. The suspension frame 5 is configured and arranged to be frictionally and fixedly supported within the second interior volume 35 and the third interior volume 40. The suspension frame 5 is advantageously constructed of a non-conductive material such as a plastic, polymer, or synthetic so as to be electrically isolated as will be further described below. Referring to FIG. 4 there is shown the suspension frame 5 as comprising a first pentagonal frame 51 and a second pentagonal frame 52. In a preferred embodiment the frames are configured as regular pentagons disposed orthogonally to one another with their uppermost ends fixed together at an apex 55 and their base members connected intermediately at an intersection point 56. This conveniently provides for a symmetrical arrangement that is robust, easy to construct, and economical to manufacture. The first pentagonal frame 51 is comprised a first leg member 51a, a second leg member 51b, a third leg member 51c, a fourth leg member 51d, and a fifth leg member 51e. The second pentagonal frame 52 is comprised a first leg member 52a, a second leg member 52b, a third leg member 52c, a fourth leg member 52d, and a fifth leg member 52e. Each of the leg members are configured to have their opposed ends connected to one another to form a respective frame. The first leg members 51a, 52a and the fifth leg members 51e, 52e have their uppermost ends connected to define the apex 55. The third leg members 51c, 52c form the base members and are disposed orthogonally and connected intermediate their distal ends to define the intersection point 56. This arrangement permits the first leg members 51a, 52a and the fifth leg members 51e, 52e to fit snuggly within the second interior volume 35. The second leg members 51b, 52b, the third leg members 51c, 52c, and the fourth leg members 51d, 52d are configured to fit snuggly within the third interior volume 40.

The suspension frame 5 is further provided with a plurality of attachment points such as an eyelet 54 or similar feature. Eyelets 54 are provided at the apex 55, the intersection point 56, and approximate a midpoint of the first leg members 51b, 52b, and the fourth leg members 51d, 52d of the first frame 51 and the second frame 52, respectively. Similarly, the piezoelectric mass 6 has a corresponding eyelet 54 or similar feature disposed thereon in alignment with a corresponding eyelet 54 disposed on the suspension frame 5. A series of resilient members are used to suspend the piezoelectric mass 6 from the suspension frame 5. In a preferred embodiment the resilient members may be coil springs having opposed ends configured to be attached to a corresponding eyelet 54. The coil springs may be configured as tension springs or as extension springs. As shown in FIG. 4 a first resilient member 53a has its opposed ends attached to the apex 55 and a top portion of the piezoelectric mass 6. A second resilient member 53b has its opposed ends attached to the second leg member 51b of the first frame 51 and a side portion of the piezoelectric mass 6. An additional resilient member such as a third resilient member 53c has its opposed ends attached to the intersection point 56 and a bottom portion of the piezoelectric mass 6. As such, the first resilient member 53a and the additional or third resilient member 53c are diametrically opposed to one another. A fourth resilient member 53d has its opposed ends attached to the fourth leg member 51d of the first frame 51 and a side portion of the piezoelectric mass 6. As such, the fourth resilient member 53d and the second resilient member 53b are diametrically opposed to one another. A fifth resilient member 53e has its opposed ends attached to the second leg member 52b of the second frame 52 and a side portion of the piezoelectric mass 6. A sixth resilient member 53f has its opposed ends attached to the fourth leg member 52d of the second frame 52 and a side portion of the piezoelectric mass 6.

Figure 5:
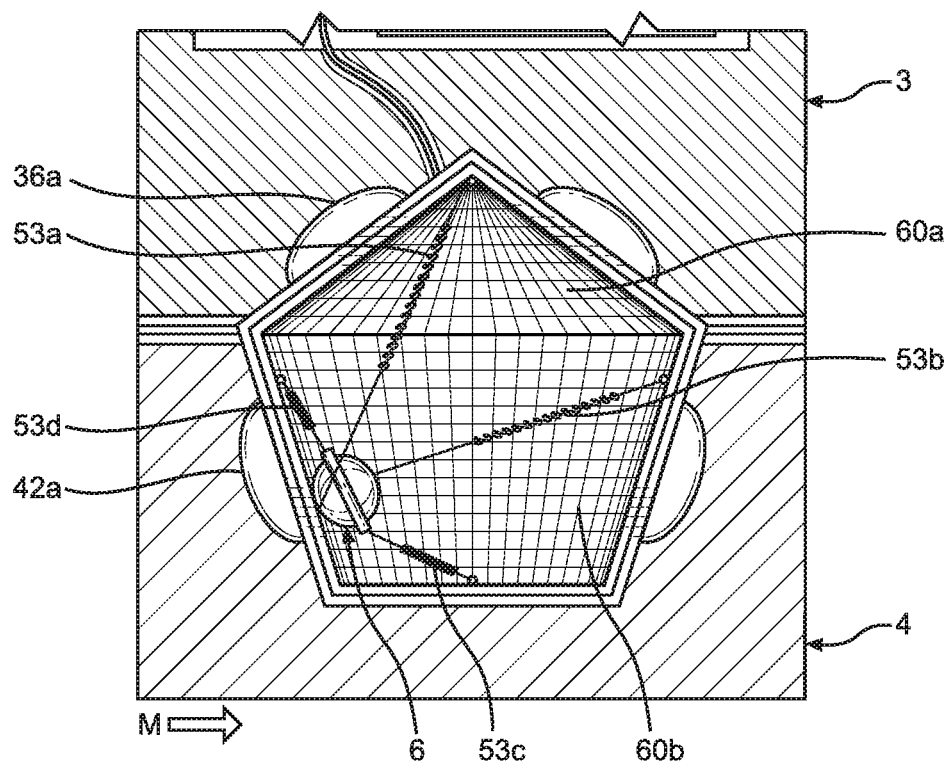
FIG. 5 is a partial cross sectional view depicting the impacting of the piezoelectric mass within the third interior volume upon movement of the energy harvesting power bank.
Figure 6:
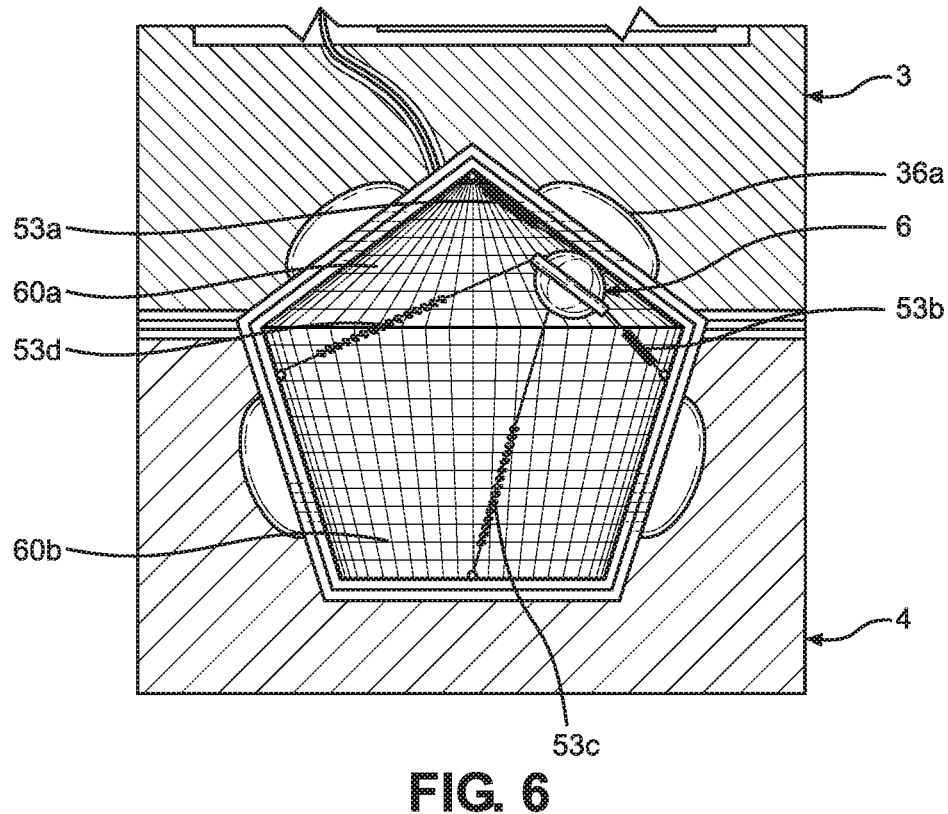
FIG. 6 is a partial cross sectional view depicting the impacting of the piezoelectric mass within the second interior volume after the movement of the energy harvesting power bank.

As referred to above, the resilient members are configured as coil springs having a selected spring rate and spring load such that each coil spring is at a free length whereby the piezoelectric mass 6 is held in equilibrium when the energy harvesting power bank 1 is at rest, as depicted in FIG. 3. The resilient members are further configured that upon movement M of the energy harvesting power bank 1 the piezoelectric mass 6 readily impacts upon the truncated conical surface 42 of the third interior volume 40, as shown in FIG. 5. At the absence of this movement M the piezoelectric mass 6, under the influence of the first resilient member 53a and the second resilient member 53b, impacts upon the conical interior surface 36 of the second interior volume 35, as depicted in FIG. 6. Thereafter it can be realized that under the influence of the third resilient member 53c and the fourth resilient member 53d the piezoelectric mass 6 will again impact with the truncated conical surface 42. The piezoelectric mass 6 will continue to impact upon the surfaces of the second interior volume 35 and the third interior volume 40 until the kinetic energy stored by the resilient members have been exhausted. This arrangement easily lends for the impacting of the piezoelectric mass 6 upon incidental movement such as when one carries the energy harvesting power bank 1 during their normal course of daily activities.

The piezoelectric mass 6 is composed of a piezoelectric layer 62 of material. Suitable materials for the piezoelectric layer 62 may include but are not limited to one of quartz crystal, single-crystalline plates; or ceramic piezoelectrics such as PZT made from lead zirconate titanate, barium titanate, or lithium niobate. A first metal semi-sphere impact disc 61 is secured to an upper surface of the piezoelectric layer 62 by the use of a conductive adhesive. Similarly, a second metal semi-sphere impact disc 63 is secured to a bottom surface of the piezoelectric layer 62 by the use of a conductive adhesive. Other suitable methodologies may be employed in securing the impact discs to the piezoelectric material as will be evident to one of ordinary skill.

In use, upon the piezoelectric mass 6 impacting one of the conical interior surface 36 and the truncated conical surface 42 a mechanical pressure is applied to the piezoelectric layer 62 by either the first metal semi-sphere impact disc 61 or the second metal semi-sphere impact disc 63. This forces electric charges within the piezoelectric layer 62 out of balance whereby excess negative and positive charges appear on its opposite surfaces and appears on the first metal impact disc 61 and the second metal impact disc 63, respectively. In a preferred embodiment the first resilient member 53a is configured as a conductive electrical coil spring in electrical contact with the first semi-sphere impact disc 61. As shown in FIG. 4, a first lead wire 65a has an end disposed in electrical contact with the first resilient member 53a and an opposed end in electrical contact with the wiring 65. Similarly, the additional or third resilient member 53c is configured as a conductive electrical coil spring in electrical contact with the second semi-sphere impact disc 63. A second lead wire 65b has an end disposed in electrical contact with the third resilient member 53c and an opposed end in electrical contact with the wiring 65. Thus, it can be seen that the wiring 65 transmits the electrical charges of the piezoelectric mass 6 to the energy harvester electronics 70 as will be further discussed below.

The semi-sphere impact discs 61, 63 may be hollow whereupon impact the discs undergo vertical displacement to create a lateral displacement of the piezoelectric layer 62 thereby forcing the electric charges within the piezoelectric layer 62 out of balance. Alternately, the semi-sphere impact discs 61, 63 may be of a solid relying upon their mass to compress the piezoelectric layer 62 thereby forcing the electric charges within the piezoelectric layer 62 out of balance. It is well within the scope of the invention to have one of the impact discs to be hollow and the other of the impact discs to be of a solid so as to obtain their respective advantages. The impact discs may have other suitable shapes such as elliptical, hexagonal, rectangular, or other polygonal configuration. All that is necessary is for the impact discs to have a depth to impart a displacement or compression of the piezoelectric layer 62 in response to impact.

Figure 8:
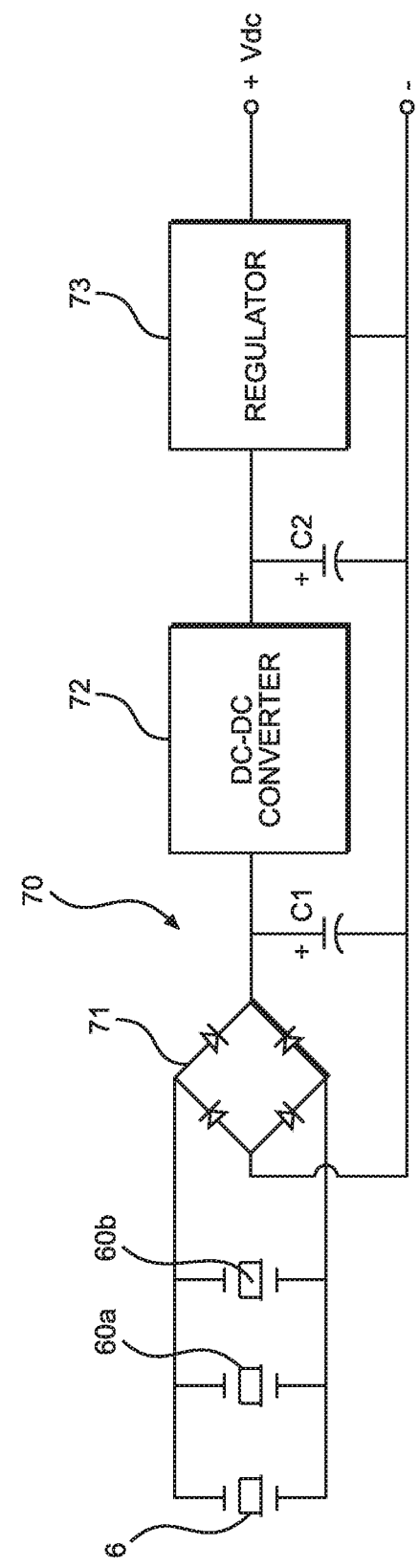
FIG. 8 is a block diagram of an energy harvester electronics according to an embodiment of the present invention of FIG. 1.

Piezoelectric film 60a is bonded to the conical interior surface 36 of the second interior volume 35. Piezoelectric film 60b is bonded to the truncated conical surface 42 of the third interior volume 40. The piezoelectric films 60a, 60b may be composed of a piezoelectric material called "macro fiber composites". Macro fiber composites consist of piezoelectric fibers, an epoxy matrix, and polyimide electrodes which upon impact or deflection produces an electrical charge on its electrodes proportional to the deflection. Other types of suitable piezoelectric films may be used as will be evident to one of ordinary skill in the art. As schematically shown in FIG. 8, the piezoelectric films 60a, 60b are operably connected by their electrodes to the lead wires of piezoelectric mass 6 where electricity is conditioned by the energy harvester electronics 70. The operably connection of the piezoelectric films 60a, 60b and the piezoelectric mass 6 to one another may be either in parallel or series dependent upon the desired effective resistance of the piezoelectrics.

As discussed above, in use the piezoelectric mass 6 impacts one of the conical interior surface 36 and the truncated conical surface 42. The piezoelectric mass 6 in turn strikes one of the piezoelectric films 60a, 60b adhered thereto. This feature is beneficial for it generates additional electrical energy for harvesting. In a preferred embodiment the conical interior surface 36 has disposed thereabout recesses 36a and the truncated conical surface 42 has disposed thereabout recesses 42a. The piezoelectric films 60a, 60b overly the respective recesses 36a, 42a such that a space is created. The impacting of the piezoelectric mass 6 against the piezoelectric films 60a, 60b overlying the recesses permits the piezoelectric films 60a, 60b to deflect into the space creating additional conditions of high stress thereby generating more power available to be conditioned by the energy harvester electronics 70.

FIG. 8 depicts a block diagram schematically showing the circuit of the energy harvester electronics 70. The output of the piezoelectrics is an AC voltage. In order for this voltage to be useful it first has to be converted to a DC voltage. This is done by using a full wave bridge rectifier 71. The rectified voltage is followed by a short term storage capacitor C1 of a relatively small value having a high voltage rating. The working voltage of the high voltage rating must be higher than the no-load output value of voltage coming from the full wave bridge rectifier 71. DC-DC converter 72 is configured to convert the high voltage stored on short term storage capacitor C1 to a low voltage at a low impedance for providing a boost to the charge on long term storage capacitor C2. The long term storage capacitor C2 is of a larger value and of a lower voltage rating in relation to short term storage capacitor C1. This is advantageous for the size and cost consideration of a capacitor of a relatively small value having a high voltage rating is minimal. Likewise, the size and cost consideration of a capacitor of a larger value having a lower voltage rating is minimal. These are desired features which facilitate the housing of the energy harvester electronics 70 within the energy harvesting power bank 1. The larger value of long term storage capacitor C2 is of a sufficient value allowing the circuit to provide a constant DC voltage source. With this arrangement while long term storage capacitor C2 is charging short term storage capacitor C1 is discharging. The DC-DC converter 72 may be a high frequency stepdown DC to DC converter such as an LT1934-1 buck converter. Other suitable types of DC to DC converters may be employed as will be readily evident to one of ordinary skill.

The DC voltage present at the long term storage capacitor C2 is varied and not particularly suited for efficient operation. Hence, it is necessary to regulate the output voltage +Vdc using a regulator 73. The regulator 73 may be of the 78xx family of self-contained fixed linear voltage regulators. For providing a 5 volt DC regulated power supply the regulator 73 would be an 7805 IC. In those instances where a different voltage is required, such as a 9 volt DC supply, the regulator 73 would be an 7809 IC. Multiple voltages of different values may be configured by employing the desired regulator 73 and regulating the voltage provided by the long term storage capacitor C2. The regulated output voltage +Vdc is communicated to the onboard rechargeable battery 67 for availability to the USB port 68 thereby providing for a self-recharging power bank.

The onboard rechargeable battery 67 can be, but not limited to, a lithium-ion battery, a lithium iron phosphate battery, a lead-acid battery, or a lithium manganese battery. The energy harvester electronics 70 may include a control unit that further conditions the regulated output voltage +Vdc. Provisions may be made for the control unit to stop the output voltage +Vdc from charging the rechargeable battery 67 any further to protect the battery 67 against overcharging. The control unit may also prevent the battery power of the rechargeable battery 67 from being overly output to the portable device 60 being charged. The energy harvesting power bank 1 may be provided with a light-emitting diode LED indicator which is configured by the control unit to illuminate a particular color indicating the amount of charge available from the rechargeable battery 67.

The components of the energy harvester electronics 70 may be suitably arranged and mounted on a circuit board 66 and housed within the internal area of the generally elongated body of the energy harvesting power bank 1. More particularly, the circuit board 66 is within the first interior volume 30 of the intermediate member 3. The USB port 68 may also be operably arranged and mounted on the circuit board 66 such that it is in communication with the opening 34 of the first interior volume 30. The channel opening 33 in communication with the first interior volume 30 and the second interior volume 35 accommodates the wiring 65 to the circuit board 66.

Figure 7:
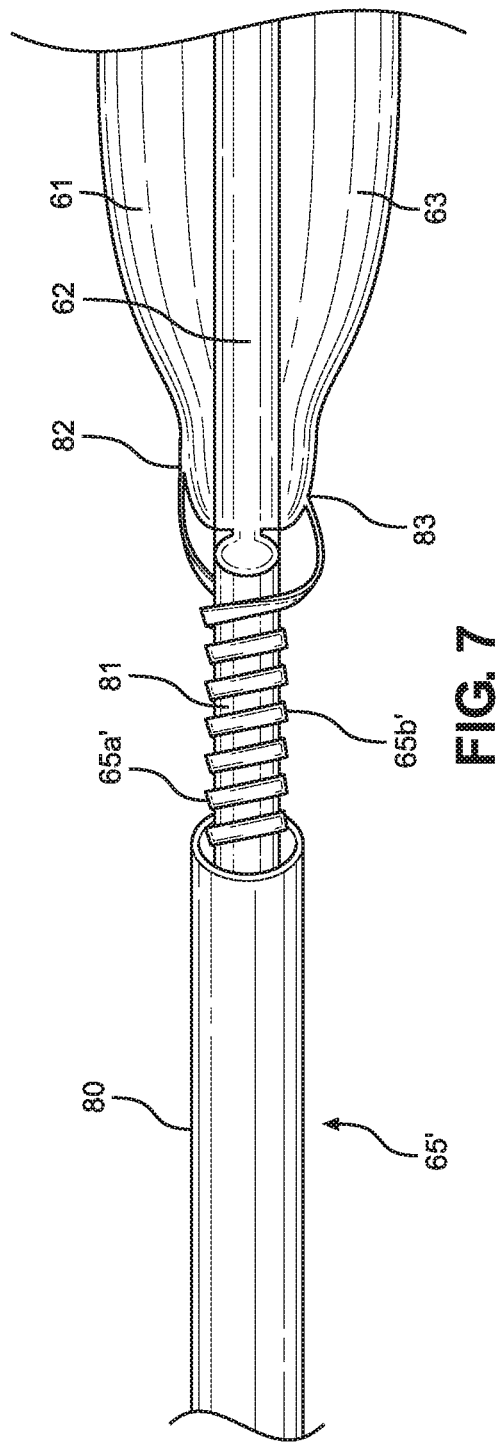
FIG. 7 is a partial detail of an elastic wiring according to another embodiment of the present invention of FIG. 1.

FIG. 7 depicts an alternate embodiment that provides for suitably interconnecting the wiring of the piezoelectric mass 6 to the energy harvester electronics 70. As shown elastic wiring 65' is provided and advantageously may replace one of the resilient members. The elastic wiring 65' also alleviates the need for the use of conductive electrical coil springs in transmitting electrical energy. The elastic wiring 65' is comprised of an elastic body 81 having a first lead wire 65a' and a second lead wire 65b' spirally wound thereabout. Disposed about the elastic body 81 and encapsulating the lead wires 65a', 65b' is a soft and movable outer covering 80. The spiralling of the lead wires 65a', 65b' means there is enough length to allow it to be extended in response to stretching and contraction of the elastic body 81 without incident. The first lead wire 65a' is affixed to the first semi-sphere impact disc 61 at a first attachment point 82. The second lead wire 65b' is affixed to the second semi-sphere impact disc 63 at a second attachment point 83. The elastic body 81 may be suitably adhered or fused to the piezoelectric layer 62. This provides for a robust construction whereby the stretching and contraction of the elastic wiring 65' may easily accommodate any movement of the piezoelectric mass 6.

The embodiments of the invention described herein are exemplary and numerous modifications, variations and rearrangements can be readily envisioned to achieve substantially equivalent results, all of which are intended to be embraced within the spirit and scope of the invention. For example, the disclosed shape of the energy harvesting power bank 1 has been that of a cylindrical shape so as to facilitate the understanding of the present invention. It is to be understood that following the teachings of the present invention any one of numerous polygonal shapes may be used in lieu of the cylindrical shape. Thus the top member 2, intermediate member 3, and bottom member 4 may be one of rectangular, square, hexagonal, octagonal, or the like. In similar fashion the first interior volume 30, the second interior volume 35, and the third interior volume 40 each may also be one of numerous polygonal shapes. Anyone of numerous materials available, such as but not limited to plastic, polycarbonate, polyethylene, polypropylene, polyvinyl chloride or the like, may be used in constructing the top member 2, the intermediate member 3, and the bottom member 4.

The suspension frame 5 has been described in context with a pair of orthogonally oriented regular pentagonal frames 51, 52 housed within the conical interior surface 36 of the first interior volume 30 and the truncated conical surface 42 of the third interior volume 40 which has the benefit of providing for a maximum surface area of contact with the semi-sphere impact discs 61, 63 resulting in increased efficiency of harvesting energy. However, it is well within the scope of the invention to incorporate the use of different polygonal shapes in constructing the suspension frame 5. The frame may be one of a rectangular, triangular, or other polygonal shape that is sized and dimensioned to be fixedly retained within the second interior volume 35 and the third interior volume 40.

In a preferred embodiment the suspension of the piezoelectric mass 6 from the suspension frame 5 has been described as using first through sixth resilient members 53a-35f. However, the piezoelectric mass 6 may be suspended by a fewer number of resilient members. For example, the piezoelectric mass 6 may be suitably suspended by just the first and additional or third resilient members. This would allow for more unrestricted and chaotic movement of the piezoelectric mass 6 resulting in more impact generating energy. This may be useful when the energy harvesting power bank 1 is not prone to a lot of movement but rather idle motions where the piezoelectric mass 6 needs to be able to move more readily and easily.

Depending upon the energy output requirements of the energy harvesting power bank 1 it may not be necessary to include one of the piezoelectric films 60*a*, 60*b* or both if the output of the piezoelectric mass 6 is sufficient. Alternately, if the electrical energy generated by the piezoelectric films 60*a*, 60*b* is sufficient then electrical energy generated by the piezoelectric mass 6 may be removed. This can be done by reconfiguring the piezoelectric mass 6 as a body of mass. The body of mass can be the piezoelectric mass 6 without its electrical connection to the energy harvester electronics 70. Further, the body of mass can be configured as a generally spherical or globular mass of material since the electrical energy generated by the piezoelectric layer 62 is not required. These arrangements are advantageous for they simplify construction and alleviate cost considerations.

While the energy harvesting power bank 1 of the present invention has been described in the context of a portable power bank carried on one's person it is well within the teachings of the present invention to apply the power bank to a larger platform. A larger sized power bank of the present invention may be employed and suitably placed in an environment in which motion is present. For example, a larger sized power bank may be transported in a vehicle and be suitably used to recharge devices thereby alleviating the need to rely upon the vehicles' battery. Electric cars will benefit from the present invention in which the energy harvesting power bank 1 may be configured to recharge the vehicle's battery. Machinery that reliably generates vibratory motion may also benefit from the teachings of the present invention to provide power to onboard electronics.

It will be understood that certain features and subcombinations are of utility and may be employed without reference to other features and subcombinations and are contemplated within the scope of the claims. The present invention has been described with a preferred embodiment thereof and it is understood that many changes and modifications in the described embodiment can be carried out without departing from the scope and the spirit of the invention that is intended to be limited only by the appended claims.

What is claimed is new and desired to be protected by Letters Patent is set forth in the appended claims:

1. An energy harvesting power bank for providing power, said energy harvesting power bank including a generally elongated body with an internal area, said generally elongated body comprising:
    a suspension frame configured and arranged to be frictionally and fixedly supported within said internal area;
    a piezoelectric mass configured to produce an electrical charge in response to an impact;
    a first resilient member having opposed ends attached to said suspension frame and said piezoelectric mass;
    an additional resilient member having opposed ends attached to said suspension frame and said piezoelectric mass, said additional resilient member being diametrically opposed to said first resilient member;
    said first resilient member and said additional resilient member are configured to suspend said piezoelectric mass in equilibrium when said elongated body is at rest, wherein upon movement of said elongated body said piezoelectric mass readily impacts upon a surface of said internal area and at the absence of said movement said piezoelectric mass continues to impact upon a surface of said internal area under the influence of one of said first resilient member and said additional resilient member thereby producing an electrical charge;
    an energy harvester electronics configured to receive said electrical charge, said energy harvester electronics conditioning said electrical charge into a regulated output voltage;
said elongated body further comprises a charging port, wherein said regulated output voltage is configured to supply power to said charging port.

2. The energy harvesting power bank of claim 1, wherein said energy harvester electronics comprises:
    a bridge rectifier configured to receive and convert said electrical charge to a DC voltage;
    a short term storage capacitor configured to store said DC voltage, said short term capacitor is of a relatively small value having a high voltage rating;
    a DC-DC converter configured to convert voltage stored on said short term capacitor to a low voltage at a low impedance;
    a long term storage capacitor configured to store said low voltage at a low impedance, said long term capacitor is of a larger value and of a lower voltage rating in relation to said short term capacitor;
    a regulator configured to regulate voltage stored on said long term capacitor into said regulated output voltage.

3. The energy harvesting power bank of claim 2, wherein said high voltage rating of said short term storage capacitor has a working voltage higher than a no-load output value of voltage coming from said bridge rectifier.

4. The energy harvesting power bank of claim 2, wherein said larger value of said long term storage capacitor is of a sufficient value configured to provide a constant source of voltage to said regulator.

5. The energy harvesting power bank of claim 1, wherein said piezoelectric mass comprises:
    a piezoelectric layer of material having an upper surface and a bottom surface; a first impact disc secured to said upper surface; a second impact disc secured to said bottom surface;
wherein, upon impact of said piezoelectric mass electrical charges within said piezoelectric layer appears on said first impact disc and said second impact disc.

6. The energy harvesting power bank of claim 5, wherein said first resilient member is configured as a first conductive electrical coil spring in electrical contact with said first impact disc; and said additional resilient member is configured as an additional conductive electrical coil spring in electrical contact with said second impact disc.

7. The energy harvesting power bank of claim 6, further comprising:
    wiring configured to transmit said electrical charge of said piezoelectric mass to said energy harvester electronics.

8. The energy harvesting power bank of claim 7, further comprising:
    a first lead wire having an end disposed in electrical contact with said first conductive electrical coil spring and an opposed end in electrical contact with said wiring;
    a second lead wire having an end disposed in electrical contact with said additional conductive electrical coil spring and an opposed end in electrical contact with said wiring.

9. The energy harvesting power bank of claim 5, further comprising:
    elastic wiring configured to transmit said electrical charge of said piezoelectric mass to said energy harvester electronics.

10. The energy harvesting power bank of claim 9, wherein said elastic wiring comprises:

an elongated elastic body having a first lead wire and a second lead wire spirally wound thereabout;

a movable outer covering disposed about said elastic body encapsulating said first lead wire and said second lead wire;

wherein, said first lead wire is affixed to said first impact disc at a first attachment point; said second lead wire is affixed to said second impact disc at a second attachment point; and said elastic body is attached to said piezoelectric layer.

11. The energy harvesting power bank of claim 1, further comprising:

a circuit board housed within said internal area of said elongated body; wherein said energy harvester electronics is arranged and mounted on said circuit board;

wherein, said charging port is operably arranged and mounted on said circuit board.

12. The energy harvesting power bank of claim 1, further comprising:

an onboard rechargeable battery, wherein, said regulated output voltage is communicated to said onboard rechargeable battery for availability to said charging port thereby providing for a self-charging power bank.

13. The energy harvesting power bank of claim 1, wherein a piezoelectric film is disposed within said internal area of said elongated body, said piezoelectric film is configured to produce an electrical charge in response to said impact.

14. The energy harvesting power bank of claim 1, wherein said suspension frame comprises:

a first pentagonal frame and a second pentagonal frame each having an upper end and a base member;

said first pentagonal frame and said second pentagonal frame are disposed orthogonally to one another having said upper ends fixed together at an apex and said base members connected intermediately at an intersection point.

15. The energy harvesting power bank of claim 14, wherein said opposed end of said first resilient member attached to said suspension frame is attached at said apex; and wherein said opposed end of said additional resilient member attached to said suspension frame is attached at said intersection point.

16. The energy harvesting power bank of claim 15, further comprising:

a second resilient member having opposed ends attached to said suspension frame and said piezoelectric mass;

a fourth resilient member having opposed ends attached to said suspension frame and said piezoelectric mass, said fourth resilient member being diametrically opposed to said second resilient member.

17. An energy harvesting power bank for providing power, said energy harvesting power bank including a generally elongated body having an internal area delineated by an interior surface, said generally elongated body comprising:

a piezoelectric film affixed to said interior surface of said internal area, said piezoelectric film is configured to produce an electrical charge in response to an impact;

a suspension frame configured and arranged to be frictionally and fixedly supported within said internal area;

a body of mass configured to impact said piezoelectric film in response to movement of said elongated body;

a first resilient member having opposed ends attached to said suspension frame and said body of mass;

an additional resilient member having opposed ends attached to said suspension frame and said body of mass, said additional resilient member being diametrically opposed to said first resilient member;

said first resilient member and said additional resilient member are configured to suspend said body of mass in equilibrium when said elongated body is at rest, wherein upon movement of said elongated body said body of mass readily impacts upon said piezoelectric film and at the absence of said movement said body of mass continues to impact upon said piezoelectric film under the influence of one of said first resilient member and said additional resilient member thereby producing an electrical charge;

an energy harvester electronics configured to receive said electrical charge, said energy harvester electronics conditioning said electrical charge into a regulated output voltage;

said elongated body further comprises a charging port, wherein said regulated output voltage is configured to supply power to said charging port.

18. The energy harvesting power bank of claim 17, wherein said energy harvester electronics comprises:

a bridge rectifier configured to receive and convert said electrical charge to a DC voltage;

a short term storage capacitor configured to store said DC voltage, said short term capacitor is of a relatively small value having a high voltage rating;

a DC-DC converter configured to convert voltage stored on said short term capacitor to a low voltage at a low impedance;

a long term storage capacitor configured to store said low voltage at a low impedance, said long term capacitor is of a larger value and of a lower voltage rating in relation to said short term capacitor;

a regulator configured to regulate voltage stored on said long term capacitor into said regulated output voltage.

19. The energy harvesting power bank of claim 18, wherein said high voltage rating of said short term storage capacitor has a working voltage higher than a no-load output value of voltage coming from said bridge rectifier.

20. The energy harvesting power bank of claim 18, wherein said larger value of said long term storage capacitor is of a sufficient value configured to provide a constant source of voltage to said regulator.

21. The energy harvesting power bank of claim 17, further comprising:

a circuit board housed within said internal area of said elongated body; wherein said energy harvester electronics is arranged and mounted on said circuit board;

wherein, said charging port is operably arranged and mounted on said circuit board.

22. The energy harvesting power bank of claim 17, further comprising:

an onboard rechargeable battery, wherein, said regulated output voltage is communicated to said onboard rechargeable battery for availability to said charging port thereby providing for a self-charging power bank.

23. The energy harvesting power bank of claim 17, wherein said suspension frame comprises:

a first pentagonal frame and a second pentagonal frame each having an upper end and a base member;

said first pentagonal frame and said second pentagonal frame are disposed orthogonally to one another having said upper ends fixed together at an apex and said base members connected intermediately at an intersection point.

24. The energy harvesting power bank of claim 23, wherein said opposed end of said first resilient member attached to said suspension frame is attached at said apex; and wherein said opposed end of said additional resilient member attached to said suspension frame is attached at said intersection point.

25. The energy harvesting power bank of claim 24, further comprising:
- a second resilient member having opposed ends attached to said suspension frame and said body of mass;
- a fourth resilient member having opposed ends attached to said suspension frame and said body of mass, said fourth resilient member being diametrically opposed to said second resilient member.

26. The energy harvesting power bank of claim 17, wherein said interior surface of said internal area has disposed thereabout a plurality of recesses, said piezoelectric film overlies said recesses such that a space is created;
- wherein, impacting of said body of mass against said piezoelectric film overlying said recesses permits said piezoelectric film to deflect into said space creating additional conditions of high stress thereby generating more power available to be conditioned by said energy harvester electronics.

27. An energy harvesting power bank for providing power, said energy harvesting power bank including a generally elongated body with an internal area, said generally elongated body comprising:
- a suspension frame configured and arranged to be fixedly supported within said internal area;
- a piezoelectric mass comprising a piezoelectric layer of material having an upper surface and a bottom surface;
- a first impact disc secured to said upper surface; a second impact disc secured to said bottom surface; wherein, upon impact of said piezoelectric mass electrical charges within said piezoelectric layer appears on said first impact disc and said second impact disc;
- a first resilient member having opposed ends attached to said suspension frame and said piezoelectric mass;
- an additional resilient member having opposed ends attached to said suspension frame and said piezoelectric mass, said additional resilient member being diametrically opposed to said first resilient member;
wherein, upon movement of said elongated body, said piezoelectric mass impacts upon a surface of said internal area thereby producing an electrical charge;
- an energy harvester electronics configured to receive said electrical charge, said energy harvester electronics conditioning said electrical charge into a regulated output voltage;
said elongated body further comprises a charging port, wherein said regulated output voltage is configured to supply power to said charging port.

28. The energy harvesting power bank of claim 27, wherein said energy harvester electronics comprises:
- a bridge rectifier configured to receive and convert said electrical charge to a DC voltage;
- a short term storage capacitor configured to store said DC voltage, said short term capacitor is of a relatively small value having a high voltage rating;
- a DC-DC converter configured to convert voltage stored on said short term capacitor to a low voltage at a low impedance;
- a long term storage capacitor configured to store said low voltage at a low impedance, said long term capacitor is of a larger value and of a lower voltage rating in relation to said short term capacitor;
- a regulator configured to regulate voltage stored on said long term capacitor into said regulated output voltage.

29. The energy harvesting power bank of claim 28, wherein said high voltage rating of said short term storage capacitor has a working voltage higher than a no-load output value of voltage coming from said bridge rectifier.

30. The energy harvesting power bank of claim 28, wherein said larger value of said long term storage capacitor is of a sufficient value configured to provide a constant source of voltage to said regulator.

31. The energy harvesting power bank of claim 27, wherein said first resilient member is configured as a first conductive electrical coil spring in electrical contact with said first impact disc; and said additional resilient member is configured as an additional conductive electrical coil spring in electrical contact with said second impact disc.

32. The energy harvesting power bank of claim 31, further comprising:
- wiring configured to transmit said electrical charge of said piezoelectric mass to said energy harvester electronics.

33. The energy harvesting power bank of claim 32, further comprising:
- a first lead wire having an end disposed in electrical contact with said first conductive electrical coil spring and an opposed end in electrical contact with said wiring;
- a second lead wire having an end disposed in electrical contact with said additional conductive electrical coil spring and an opposed end in electrical contact with said wiring.

34. The energy harvesting power bank of claim 27, further comprising:
- elastic wiring configured to transmit said electrical charge of said piezoelectric mass to said energy harvester electronics.

35. The energy harvesting power bank of claim 34, wherein said elastic wiring comprises:
- an elongated elastic body having a first lead wire and a second lead wire spirally wound thereabout;
- a movable outer covering disposed about said elastic body encapsulating said first lead wire and said second lead wire;
wherein, said first lead wire is affixed to said first impact disc at a first attachment point; said second lead wire is affixed to said second impact disc at a second attachment point; and said elastic body is attached to said piezoelectric layer.

36. The energy harvesting power bank of claim 27, further comprising:
- a circuit board housed within said internal area of said elongated body; wherein said energy harvester electronics is arranged and mounted on said circuit board; wherein, said charging port is operably arranged and mounted on said circuit board.

37. The energy harvesting power bank of claim 27, further comprising:
- an onboard rechargeable battery, wherein, said regulated output voltage is communicated to said onboard rechargeable battery for availability to said charging port thereby providing for a self-charging power bank.

38. The energy harvesting power bank of claim 27, wherein a piezoelectric film is disposed within said internal area of said elongated body, said piezoelectric film is configured to produce an electrical charge in response to said impact.

39. An energy harvesting power bank for providing power, said energy harvesting power bank including a generally elongated body with an internal area, said generally elongated body comprising:
- a suspension frame configured and arranged to be fixedly supported within said internal area; said suspension frame comprises a first pentagonal frame and a second pentagonal frame each having an upper end and a base member; said first pentagonal frame and said second pentagonal frame are disposed orthogonally to one another having said upper ends fixed together at an apex and said base members connected intermediately at an intersection point;

a piezoelectric mass configured to produce an electrical charge in response to an impact;

a first resilient member having opposed ends attached to said suspension frame and said piezoelectric mass;

an additional resilient member having opposed ends attached to said suspension frame and said piezoelectric mass, said additional resilient member being diametrically opposed to said first resilient member;

wherein, upon movement of said elongated body, said piezoelectric mass impacts upon a surface of said internal area thereby producing an electrical charge;

an energy harvester electronics configured to receive said electrical charge, said energy harvester electronics conditioning said electrical charge into a regulated output voltage;

said elongated body further comprises a charging port, wherein said regulated output voltage is configured to supply power to said charging port.

40. The energy harvesting power bank of claim 39, wherein said opposed end of said first resilient member attached to said suspension frame is attached at said apex; and wherein said opposed end of said additional resilient member attached to said suspension frame is attached at said intersection point.

41. The energy harvesting power bank of claim 40, further comprising:
a second resilient member having opposed ends attached to said suspension frame and said piezoelectric mass;
a fourth resilient member having opposed ends attached to said suspension frame and said piezoelectric mass, said fourth resilient member being diametrically opposed to said second resilient member;
said first resilient member, said additional resilient member, said second resilient member, and said fourth resilient member are configured to hold said piezoelectric mass in equilibrium when said elongated body is at rest, wherein upon movement of said elongated body said piezoelectric mass readily impacts said internal area and at the absence of said movement said piezoelectric mass continues to impact said internal area under the influence of one of said first resilient member, said additional resilient member, said second resilient member, and said fourth resilient member.

42. An energy harvesting power bank for providing power, said energy harvesting power bank including a generally elongated body having an internal area delineated by an interior surface, said generally elongated body comprising:
a piezoelectric film affixed to said interior surface of said internal area, said piezoelectric film is configured to produce an electrical charge in response to an impact;
a suspension frame configured and arranged to be fixedly supported within said internal area; said suspension frame comprises a first pentagonal frame and a second pentagonal frame each having an upper end and a base member; said first pentagonal frame and said second pentagonal frame are disposed orthogonally to one another having said upper ends fixed together at an apex and said base members connected intermediately at an intersection point;
a body of mass configured to impact said piezoelectric film in response to movement of said elongated body;
a first resilient member having opposed ends attached to said suspension frame and said body of mass;
an additional resilient member having opposed ends attached to said suspension frame and said body of mass, said additional resilient member being diametrically opposed to said first resilient member;
wherein, upon movement of said elongated body, said body of mass impacts upon said piezoelectric film thereby producing an electrical charge;
an energy harvester electronics configured to receive said electrical charge, said energy harvester electronics conditioning said electrical charge into a regulated output voltage;
said elongated body further comprises a charging port, wherein said regulated output voltage is configured to supply power to said charging port.

43. The energy harvesting power bank of claim 42, wherein said energy harvester electronics comprises:
a bridge rectifier configured to receive and convert said electrical charge to a DC voltage;
a short term storage capacitor configured to store said DC voltage, said short term capacitor is of a relatively small value having a high voltage rating;
a DC-DC converter configured to convert voltage stored on said short term capacitor to a low voltage at a low impedance;
a long term storage capacitor configured to store said low voltage at a low impedance, said long term capacitor is of a larger value and of a lower voltage rating in relation to said short term capacitor;
a regulator configured to regulate voltage stored on said long term capacitor into said regulated output voltage.

44. The energy harvesting power bank of claim 43, wherein said high voltage rating of said short term storage capacitor has a working voltage higher than a no-load output value of voltage coming from said bridge rectifier.

45. The energy harvesting power bank of claim 43, wherein said larger value of said long term storage capacitor is of a sufficient value configured to provide a constant source of voltage to said regulator.

46. The energy harvesting power bank of claim 42, further comprising:
a circuit board housed within said internal area of said elongated body; wherein said energy harvester electronics is arranged and mounted on said circuit board;
wherein, said charging port is operably arranged and mounted on said circuit board.

47. The energy harvesting power bank of claim 42, further comprising:
an onboard rechargeable battery, wherein, said regulated output voltage is communicated to said onboard rechargeable battery for availability to said charging port thereby providing for a self-charging power bank.

48. The energy harvesting power bank of claim 42, wherein said opposed end of said first resilient member attached to said suspension frame is attached at said apex; and wherein said opposed end of said additional resilient member attached to said suspension frame is attached at said intersection point.

49. The energy harvesting power bank of claim 48, further comprising:
a second resilient member having opposed ends attached to said suspension frame and said body of mass;
a fourth resilient member having opposed ends attached to said suspension frame and said body of mass, said fourth resilient member being diametrically opposed to said second resilient member;
said first resilient member, said additional resilient member, said second resilient member, and said fourth resilient member are configured to hold said body of mass in equilibrium when said elongated body is at rest, wherein upon movement of said elongated body said body of mass readily impacts upon said piezoelectric film and at the absence of said movement said body of mass continues to impact upon said piezoelectric film under the influence of one of said first resilient member, said additional resilient member, said second resilient member, and said fourth resilient member.

50. The energy harvesting power bank of claim 42, wherein said interior surface of said internal area has disposed thereabout a plurality of recesses, said piezoelectric film overlies said recesses such that a space is created;

wherein, impacting of said body of mass against said piezoelectric film overlying said recesses permits said piezoelectric film to deflect into said space creating additional conditions of high stress thereby generating more power available to be conditioned by said energy harvester electronics.

\* \* \* \* \*